United States Patent [19]

Jimenez

[11] 4,145,981

[45] Mar. 27, 1979

[54] VIBRATING SEED PLANTER DELIVERY CHUTE FOR SINGULAR SEED DISPENSING

[75] Inventor: Miguel A. Jimenez, Douglas, Ariz.

[73] Assignee: S & T Venture, Glendale, Ariz.

[21] Appl. No.: 860,680

[22] Filed: Dec. 15, 1977

[51] Int. Cl.² ............................................. A01C 7/04
[52] U.S. Cl. ........................................ 111/76; 111/65;
 111/69; 198/540; 198/771; 221/268; 222/199;
 222/409
[58] Field of Search .................... 111/75, 65, 76, 69;
 221/200, 202, 204, 205, 268; 222/161, 196, 197,
 198, 199, 202, 203, 409, 413, 547, 564; 198/540,
 752, 769, 771

[56] References Cited

U.S. PATENT DOCUMENTS

| 2,696,285 | 12/1954 | Zenlea | 221/200 X |
| 2,800,252 | 7/1957 | Wahl | 198/540 X |
| 3,633,522 | 1/1972 | Main | 111/69 |

FOREIGN PATENT DOCUMENTS

| 444283 | 5/1927 | Fed. Rep. of Germany | 222/413 |
| 969352 | 12/1950 | France | 111/65 |
| 713748 | 8/1954 | United Kingdom | 222/197 |
| 989995 | 4/1965 | United Kingdom | 111/76 |
| 195361 | 4/1967 | U.S.S.R. | 221/200 |

Primary Examiner—Clifford D. Crowder
Assistant Examiner—Steven A. Bratlie
Attorney, Agent, or Firm—Wills, Green & Mueth

[57] ABSTRACT

An automatic seed planter which includes an elongate, upwardly-opening V-shaped trough with front and rear ends defining a longitudinally extending, upwardly opening seed-conducting channel, a seed receiving chamber at the front end of the trough, elongate guide means in the chamber overlying the channel to pass seed from the chamber downwardly and longitudinally rearwardly into the rear end portion of the channel, means to vibrate the trough and cause seed in the chamber to migrate past the guide and into the channel at a predetermined rate, and a seed discharge opening at the rear end of the channel.

15 Claims, 6 Drawing Figures

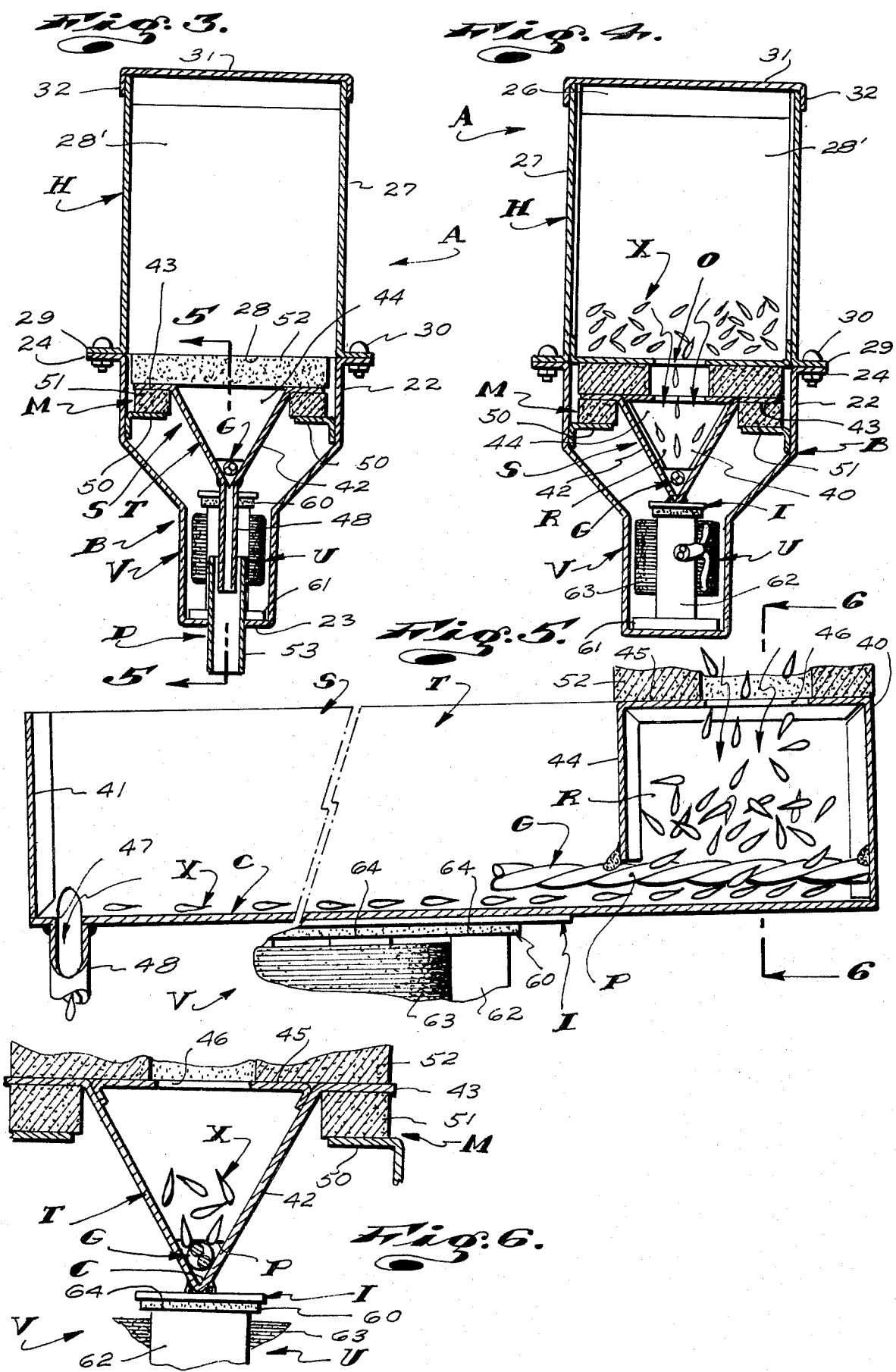

VIBRATING SEED PLANTER DELIVERY CHUTE FOR SINGULAR SEED DISPENSING

BACKGROUND AND BRIEF SUMMARY OF THE INVENTION

In the commercial growing of flowers and produce, the seeds from which plants are grown can be divided into two basic classes. One class is "easy to plant seeds", such as corn and peas, and the other class is "hard to plant seeds", such as lettuce and celery. The easy to plant seeds are those seeds which are sufficiently large and of sufficient uniform configuration that they can be easily and effectively dispensed, one at a time, by various mechanical dispensing mechanisms or devices suitable for field use and which are economical and practical to make, use and maintain. The hard to plant seeds are those seeds which are so small and of such shape that they do not lend themselves to being dispensed in a uniform, one at a time manner by those mechanical seed dispensing means provided by the prior art.

To enable seed dispensing means provided by the prior art to effectively dispense small, hard to plant seeds, it is common practice to imbed or encase the seeds in clay pellets of a size and shape particularly suitable for being worked upon by the seed dispensing means of the prior art. In the case of pelletized seeds, such as noted above, the pellets in which the seeds are imbedded are the structures which are worked upon by the dispensing means, not the seeds, per se.

While the pelletizing of hard to plant seeds has enabled commercial growers to effect the planting of such seeds by means of existing and available seed dispensing means, the required use of pelletized seeds presents several serious shortcomings. First, the cost of pelletized seeds is excessive; second, the rate of failure of pelletized seeds to germinate is considerably greater than that of raw or unpelletized seeds; third, to effect germination of pelletized seeds, excessive water must be used to dissolve or break down the pellets; and fourth, the source of supply of pelletized seeds is restricted to those seed companies with the facilities to pelletize seeds.

One pound of raw lettuce seed contains about 450,000 seeds and presently sells for about $ 28.00 per pound. One pound of pelletized lettuce seeds contains about 45,000 seeds and presently sells for about $ 7.00 per pound. Accordingly, the cost of pelletized seeds is two to three times greater than the cost of raw seeds.

In use, subsequent to planting pelletized seeds, the planted fields must be subjected to heavy and protracted overhead watering to effect adequate wetting and breaking down of the pellets and resulting germination of the seeds; while in the case of raw seeds, moderate irrigation of the fields and moistening of the soil in which the seeds are planted is required to effect germination. As a rule, the cost of the additional amount of water required to reduce the pellets and effect germination of pelletized seeds is many times the cost of the seeds and constitutes a direct additional cost in the use of such seed.

Further, the soil conditions of some farm land is such that the heavy watering required in the use of pelletized seed would result in such adverse effect that the use of such seed is rendered impossible or impractical.

In the case of pelletized seeds, the process to which the seeds are subjected when being pelletized results in a high loss of germination. This loss of germination is compounded by a high secondary loss of germination which results from the failure of some pellets to effectively break down in the soil, after planting and watering.

Due to the high loss of germination experienced in the use of pelletized seeds, it is often necessary that a grower use considerably more pellets or seeds per acre than should be required, thus further increasing the cost of planting.

It is to be understood that the term "clay" in describing pelletized seeds is used in a generic sense and is intended to include materials other than clay which are or might be used to coat and carry seeds.

As a result of the above noted shortcomings and/or disadvantages to be found in the use of pelletized seeds, there has been a long recognized want and need for a simple, practical mechanical seed dispensing device suitable for infield use and capable of effectively dispensing small, irregularly shaped, hard to plant seeds, one at a time and at a substantially uniform or steady rate.

It is an object and feature of my invention, therefore, to provide a novel automatic seed planter which is capable and effective to dispense small, irregularly shaped seeds, one at a time, at a substantially uniform rate.

Another object and feature of my invention is to provide a seed dispensing device of the character referring to above which is extremely simple and economical to make, and which can be effectively carried by a vehicle or other mobile field equipment to dispense seeds in a field prepared for the planting and over which the vehicle or equipment is operated.

A further object and feature of the present invention is to provide a seed dispensing means or device of the general character referred to above which includes few parts, each of which parts is easy and simple to manufacture, use and assemble and a device which is highly effective and dependable in operation.

I have discovered that the above objects and advantages are achieved by a device which includes seed supply means, an elongate substantially V-shaped, upwardly-opening seed receiving hopper related to and receiving seed from the supply means and having a lower seed outlet opening at one end, an elongate seed guide arranged within the hopper and cooperatively related with the outlet opening, and shaker means to vibrate the hopper and guide to cause seeds in the hopper to migrate downwardly and to move out through the outlet opening, one at a time, and at a substantially uniform rate.

DESCRIPTION OF THE DRAWINGS

FIG. 3 is a vertical sectional view taken substantially as indicated by line 3—3 in FIG. 2;

FIG. 4 is a vertical sectional view taken substantially as indicated by line 4—4 in FIG. 2;

FIG. 5 is an enlarged detailed, vertical sectional view taken substantially as indicated by line 5—5 in FIG. 3; and FIG. 6 is a vertical sectional view taken substantially as indicated by line 6—6 in FIG. 5.

DESCRIPTION OF THE PREFERRED EMBODIMENT

Figure 1:
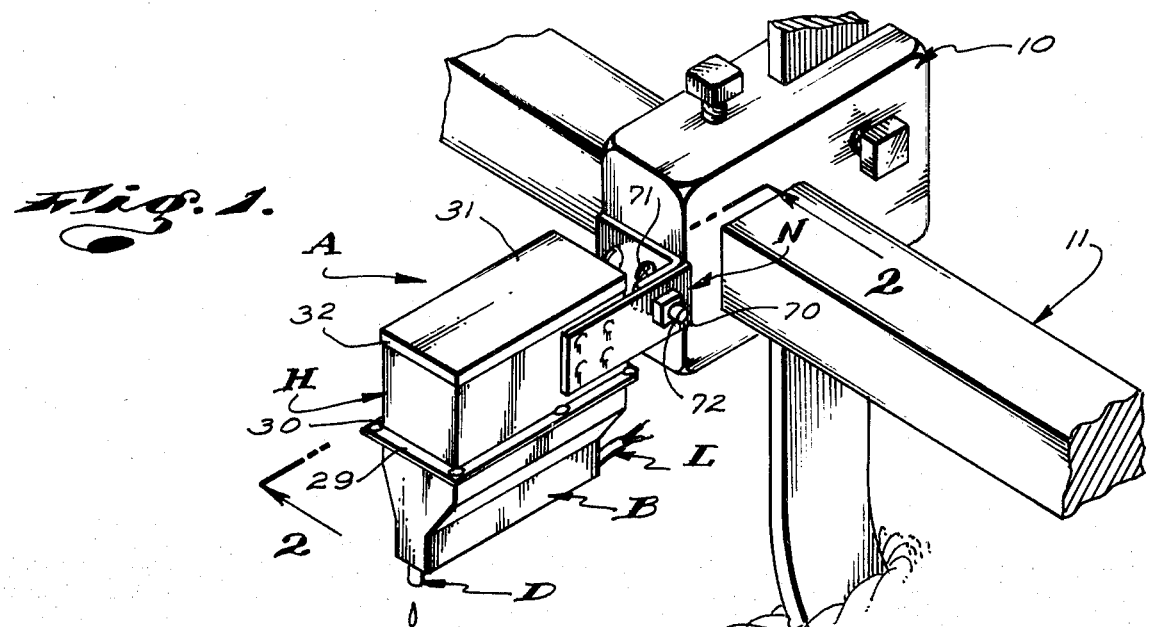
FIG. 1 is an isometric view of my new automatic seed planter, showing it related to a piece of field equipment.
Figure 2:
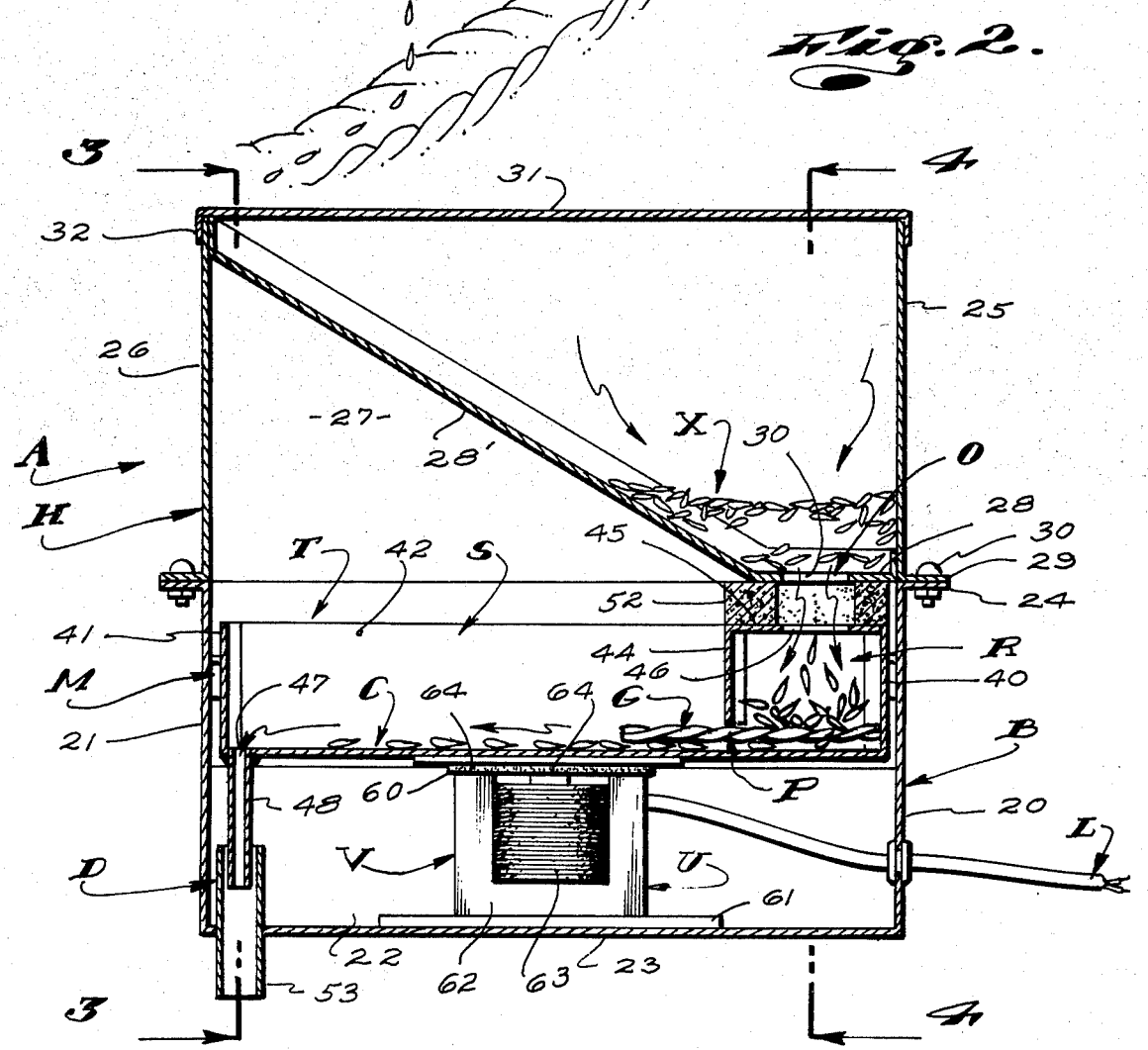
FIG. 2 is an enlarged, vertical sectional view taken substantially as indicated by line 2—2 in FIG. 1.

In FIG. 1 of the drawings, I have shown my novel automatic seed planter A suitably mounted on a part 10 of a piece of field equipment 11 (a portion of which is shown). The piece of field equipment 11 can be any suitable piece of equipment that might be used in the course of preparing a field for the planting of seeds and which is advanced or drawn across a field by a suitable draft vehicle, such as the tractor.

In FIG. 1 of the drawings, I have also shown a portion of the surface 12 of the field over which the equipment 11 has moved and have illustrated the manner in which seeds X, worked upon by the device A, are dispensed.

Since the field equipment with which my device A might be related can vary widely in form and construction, without in any way departing from or affecting the novelty of my invention, further consideration and/or detailed description of the equipment 11 shown in the drawings can and will be dispensed with.

For the purpose of this disclosure, it will suffice to note that the device A is operable to dispense and drop seeds, one at a time, and at a desired rate onto the surface of the field to be planted. The device A can be related to and carried by any piece of field equipment suitable for supporting and transporting the device at a desired rate, on a desired course, and in desired spaced relationship above the surface of the field to be planted.

The device A that I provide includes generally, a body B, a segregator S, support means M supporting the segregator within the body, a seed supply hopper H carried by the body and supplying the segregator S with seed, an electro-magnetic shaker or vibrator means V, and seed discharge means D. Additionally, the device A includes mounting means N to mount the device on a related piece of equipment, such as the equipment 11 shown in FIG. 1 of the drawings.

The body B of the device A is essentially, a simple elongate, upwardly opening rectilinear sheet metal box with flat, substantially vertical front and rear end walls 20 and 21, side walls 22, a flat, substantially horizontal bottom wall 23 and an open top. The body is preferably provided with a flat, horizontal, outwardly projecting mounting flange 24 about the perimeter of its open top.

In practice, and to conserve space, the side walls 22 can have outer upper portions, inner lower portions and inclined intermediate portions, whereby the lower portion of the body is less in lateral extent than the upper portion thereof, as clearly indicated in the drawings.

The seed supply hopper is, essentially, a simple, elongate, upwardly opening rectilinear sheet metal box-like unit with flat vertical front and rear walls 25 and 26, side walls 27, a bottom wall 28 and an open top. The bottom wall 28 has a flat horizontal forward portion of minor longitudinal extent with a substantially centrally located vertical through opening O and has a rearwardly and upwardly inclined forward portion 28' of major longitudinal extent. The rear portion 28' is at a suitable angle and is of sufficient longitudinal extent to cause seed deposited in the hopper, above the bottom wall, to normally freely move and advance forwardly and downwardly in the hopper to the opening O, as seed within the hopper is dispensed therefrom.

The hopper is preferably provided with a flat, horizontal, outwardly projecting mounting flange 29 about the perimeter of its bottom, which flange normally establishes opposing bearing engagement with the flange 24 on the body B.

The flanges 24 and 29 are provided with registering openings through which suitable screw fastening means 30 are engaged to releasably secure the body and hopper in assembled relationship, as shown in the drawings.

In addition to the foregoing, the hopper H is provided with a simple flat cover plate 31 with a downwardly extending retaining flange 32 about its perimeter. The cover plate or cover 31 is releasably engaged about and in overlying relationship with the upper portion of the hopper to normally close the top thereof.

The segregator S that I provide includes an elongate upwardly opening V-shaped trough T of sheet metal. The trough T has flat, vertical front and rear end walls 40 and 41, flat, laterally upwardly and outwardly divergent or inclined side walls 42, and flat, horizontal, longitudinally extending and laterally outwardly projecting support flanges 43 at the upper edges of the side walls.

The flanges 43 are parts or portions of the support means M which will hereinafter be described.

The lower edge portions of the side walls of the trough T converge to define a longitudinally extending, upwardly opening, V-shaped seed supporting and conducting channel portion or channel C in the lowermost portion of the trough.

In addition to the foregoing, the trough T of the segregator S is provided with a flat, horizontal, transversely extending partition 44. The partition 44 is parallel with and is spaced a limited predetermined distance rearward of the front end wall 40 of the trough to define an upwardly opening seed receiving compartment R in the forward end portion of the trough.

The partition 44 is a triangular part arranged in the trough with its apex disposed downwardly. The lower apex portion of the partition is truncated or cut off so that it does not extend into the lower inside corner or channel C of the trough, but terminates above the channel C to define a transfer passage P between the receiving chamber R at the forward end of the trough and the portion of the trough rearward of the partition.

In practice, if desired, and as illustrated in the drawings, the partition 44 can be provided with a flat, horizontal, rearwardly projecting top wall 45 to overlie and close the top of the chamber R. The top wall 45 is provided with a substantially centrally located vertical through opening 46.

The segrator S next includes a vertical outlet opening 47 communicating with the bottom of the channel C at the rear end of said channel and through which seed advanced rearwardly in the channel is free to drop. The trough T is preferably provided with a vertical, downwardly extending outlet tube 48 at its rear end, which tube communicates with the opening 47 and serves to conduct seed advanced through the outlet opening 47 downwardly through the device.

The tube 48 constitutes a part of the seed discharge means D, which means will be hereinafter described.

Finally, the segregator S includes an elongate, horizontal seed guide G arranged in the channel C of the trough T to extend longitudinally thereof, from the front wall 44 through the chamber R, through the passage P and into the portion of the channel immediately rearward of the chamber R or partition 44.

The seed guide G is an elongate, horizontal unit established of two lengths of wire, of suitable guage and round in cross-section. The two lengths of wire are twisted together to establish what is, in effect, an elongate double threaded, helical screw unit with an extremely steep pitch. The root depth of the helical grooves defined by the guide is equal to the radius of the guide. The flanks and pitch of the thread-like portions of the guide are radiused or round. The root portion of the helical grooves defined by the twisted together wires are undercut and enlarged by virtue of the round cross-section of the wires.

The above noted characteristics and/or features of the guide G play an important part in the effective operation of my invention and are such that the guide here provided cannot be replaced by a conventional machined screw element to gain equally effective and satisfactory end results.

The guide G is arranged in the channel C to extend longitudinally thereof with the pitch of the thread portions of the guide in bearing contact with the downwardly and laterally inwardly converging surfaces of the side walls and/or channel C. The guide is supported in the trough with its lower portion spaced above the bottom of the channel C a distance sufficient to freely accommodate and allow for the free longitudinal movement of seeds in the channel C below the guide G.

The top of the guide, where it extends through the passage P is secured to the partition 44 as by welding, soldering or the like, to fix the guide in place. The solder or weld securing the guide to the partition serves to seal the portion of the passage P about the upper portion of the guide G and thereby prevents seed in the chamber R from advancing rearwardly through the opening P, above the guide.

The helical grooves defined by the guide G cooperate with the surfaces of the trough and/or channel C related thereto to define a plurality of longitudinally spaced seed conducting passages extending downwardly and longitudinally rearward from the chamber R, above the guide, to the channel C below the guide. The grooves and/or seed conducting passages defined by the grooves and the sides of the trough are sufficiently greater in cross-sectional dimension than the cross-sectional dimensions of the seeds being worked upon to allow for the free downward and rearward passage of seed (preferably one at a time) from the chamber R and into the channel C beneath the guide.

The grooves of the guide and/or the passages defined by the grooves and the side surfaces of the channel are at a low angle from horizontal; for example, they are at an angle of about 15°. The angle of the grooves or passages and the longitudinal extent of said grooves or passages are such that seed in the chamber R, above the guide, will not normally migrate therethrough and into the channel C beneath the guide. Rather, the passages or grooves are so disposed and of such longitudinal extent that seed in the chamber R, above the guide, is normally stopped by and establish a sufficiently stable bridging structure above the guide so that seed with not advance downwardly from the chamber R by the guide G and into the channel C.

The above structure and relationship of seed therewith is such that upon vibrating or shaking the structure, the seed engaged with the top of the guide will move and migrate downwardly and longitudinally through the grooves or passages and into the channel C.

Still further, the rate of migration of the seed through the grooves or passages and into the channel C is dependent upon the magnitude and frequency or rate of the vibrating or shaking forces imparted into the trough and can be accurately controlled by modulating the rate and magnitude of the forces and/or by pitching the trough T rearwardly and downwardly so as to change the effective angular dispositioning of the grooves or passages.

In practice, in light of the environment in which my invention is to be used, it is preferred that the vibrator means V, provided to vibrate or shake the trough T, be such that the trough is vibrated at a rate and with forces of sufficient magnitude so that no seed will migrate from the chamber R, by the guide G and into the channel C when the trough T is horizontally disposed, but will cause seed to move and migrate through the construction as noted above when the trough and the guide G therein are inclined rearwardly and downwardly.

In carrying out the above, the rate of flow, movement or migration of seed is proportional to and can be accurately controlled by the angular disposition of the trough T and guide G therein.

Another important feature of my invention is the radiused configuration of the grooves defined by the guide unit and resulting from the round cross-section of the wires which establish the guide unit. The rounded or radiused configuration of the grooves is such that when elongated, ovoid or other irregularly shaped seed are worked upon, the guide operates to orient the seeds so that as they advance through the grooves or passages, their major axes are aligned with the axes of the grooves or passages. As a result of the above aligning of the seed in the grooves or passages, when the seeds drop from engagement with the guide G, into the channel C, their major axes are aligned with the longitudinal axis of the channel. As a result of the foregoing, seed advanced from the guide G into the channel C are properly aligned for effective controlled, uniform movement or migration longitudinally of the channel. They are not deposited in the channel in a haphazard manner which is likely to result in the seed collecting and establishing bridging masses within the trough, which would interfere, impede or stop desired and effective operation of the construction.

The lateral and longitudinal outside dimensions of the trough T are slightly less than the longitudinal and major lateral inside dimensions of the body B and the vertical extent of the trough T is substantially less than the vertical extent of the body B, whereby the trough can be freely arranged within the body with its bottom edge in vertical spaced relationship above the bottom wall 23 of the body B.

The support means, in addition to the above noted flanges 43 on the trough T, includes flat, horizontal, longitudinally extending lower support flanges 50 fixed to and projecting laterally inwardly from the side walls 22 of the body B to occur in vertical spaced, parallel relationship with the flanges 43 (when the trough T is arranged within the body B) and elongate shock pads 51 of suitable soft, resilient material, arranged in bearing engagement with and between flanges 43 and 50. The pads 51 can be established of foam rubber or foam plastic and are preferably fixed to the flanges 50 to prevent their displacement. The pads 51 are of sufficient cross-section and of sufficient resiliency so that the trough T is substantially free to move within the body throughout that range of movement which is to be imparted thereto by the vibrator means V, as will hereinafter be described.

The pads 51 are also such that they effectively serve to dampen or buffer shock forces imparted into the construction from external forces and thereby reduce or eliminate adverse effects which might otherwise be caused thereby.

The trough T is arranged in the body B with the top of the chamber R or with the opening 46 in the top wall 45 in vertical alignment with and in spaced relationship below the opening O in the bottom wall 28 of the hopper H, whereby seed in the hopper and advancing through the opening O is free to flow into the chamber R and maintain the chamber filled with seed.

To assure the direct and controlled flow of seed from the hopper H into the chamber R, I provide an apertured spongy or soft and resilient seed-conducting spacer block 52 between the bottom wall of the hopper and the top wall 45. The block 52 is provided with a central opening or passage which registers and communicates with the through openings in the said bottom and top walls.

The seed dispensing means D, in addition to the above noted outlet tube 48 on the trough T, includes a dispensing tube 53 extending through and fixed to the bottom wall 23 of the body B. The tube 53 is larger in diameter than the tube 48 and is axially aigned therewith so that when the trough T is engaged in the body B, the lower end portion of the tube 48 freely enters the upper end portion of the tube 53, as clearly illustrated in the drawings.

With the means D set forth above, it will be apparent that seed conducted in and through the construction is conducted out of the construction through the means D and is dispensed in an effective and desirable manner for planting.

The vibrator means V that I provide includes an electro-magnetic core and coil unit U fixed within the body B to occur below the trough T, substantially intermediate the ends thereof, a ferrous iron armature plate I fixed to the bottom edge of the trough to occur in operating gap spaced relationship from the unit U and a resilient spacer 60 between the armature and the coil unit.

The coil unit U has a base 61 fixed to the bottom wall of the body B. The core 62 of the unit U, about which the coil 63 is wound, has upper, vertically disposed pole ends 64 which occur in spaced, parallel, opposing relationship with the armature I. The armature I is a simple flat plate of ferrous metal fixed to the lower edge of the trough T as by welding. The spacer 61 is preferably a flat sheet of resilient foam plastic or the like and is preferably cemented of otherwise fixed to either the armature or the core to prevent its displacement. The coil of the unit U is connected with a suitable alternating current power supply (not shown) carried by the related piece of field equipment 11, by means of a power line L which extends from the coil and opening in the body and thence to the referred to power supply.

The means V is such that when the coil is energized, the armature I is caused to vibrate and the trough T to which the armature fixed is moved or vibrated therewith.

It is important to note that the unit U is fixed to the body and the armature is fixed to the trough T, which trough is supported in the body for free movement relative thereto. With this construction and relationship of parts, the vibrating motion generated by the means V is imparted directly and positively into the trough T and a constant, uniform vibrating motion of the trough T is assured. That is, the motion imparted into the trough is positive and constant or uniform and is to be distinguished from vibrating motion that might be imparted into the trough structure by an electro-magnetic unit and by intermediate link and lever means, spring means and the like, which, due to working tolerances and natural or resonant frequencies of the structure going to make them up are subject to generating non-positive and unstable motion.

The mounting means N that I provide to mount the construction on its related piece of field equipment 11 is preferably such that it affords or permits easy and convenient adjustment of the longitudinal angular disposition of the construction.

In practice, the means N can vary widely without affecting or departing from the spirit of my invention.

In the case illustrated, the means N includes an elongate, flat mounting plate 70, fixed to one side of the hopper H and projecting rearwardly therefrom. The plate 70 occurs on a vertical plane. The means N next includes a mounting flange 71 fixed to the part 10 of the equipment 11 and occurring in flat bearing engagement with the plate 70. In the case illustrated, the flange 71 is one side or flange of a piece of angle section, the other side or flange of which is fixed to the part 10 by screw fastening means or the like.

Finally, the means N includes a screw fastener assembly 72 engaged through the plate 70 and flange 71 and operable to releasably urge and hold the plate and flange in tight, fixed, clamped engagement with each other.

With the means N set forth above, it will be apparent that the construction is effectively supported on the equipment 11 and that by suitable operation of the means 72, the plate can be pivoted relative to the flange to adjust the angle of the structure, as desired, or as circumstances require.

In use or operation, the structure is assembled and mounted on its related field equipment substantially as shown in the drawings, and as described in the preceding. The hopper is filled with seed and the vibrator means V is energized. The construction is let to operate until seed commences to drop, one at a time, from the tube 51. The timing or rate at which the seeds drop from the tube 51 is adjusted by changing the angular disposition of the construction, through the means N, until the rate at which the seeds drop is such that when the construction is transported across a field to be planted, at a predetermined operating speed, the seeds dropped will be planted at desired, predetermined spaced points along the line of travel. The construction is then set in the desired adjusted position; the field equipment is put into operation; and planting of the field is carried forward.

In the preferred carrying out of the invention, the longitudinal extent of the rear portion of the channel C, rearward of the chamber R and partition, is substantially greater than the longitudinal extent of the forward portion of the channel occurring in the chamber R and related to the guide G. As seed are advanced from the chamber R into the forward portion of the channel C, through the several grooves or passages defined or established by the guide G, they tend to accumulate and establish close relationship with each other throughout the forward portion of the channel. As the construction is vibrated and the seeds in the channel are caused to migrate downwardly and longitudinally of the rear portion thereof, their rate of travel in the channel tends to increase uniformly and the spacing between adjacent seeds in the channel becomes greater and substantially uniform. To attain the above rule of action, it is necessary that the rear end portion of the channel, that is, the portion of the channel extending rearward from the chamber R and guide G be of substantial longitudinal extent.

While the above rule of action or phenomenan cannot be explained, it has been observed to take place in several embodiments of my invention and serves the necessary function of spacing and moving the seeds rearward in the channel for ultimate effective metered dispensing of the seeds.

It will be apparent that while the box-like body B serves a suitable and strong base like structure on and with which the other parts and means of my invention can be effectively related, a more open frame like structure for supporting, carrying and relating the various parts and means of the construction could be employed without departing from the spirit of my invention.

Having described only one typical preferred form and carrying out of my invention, I do not wish to be limited to the specific details herein set forth, but wish to reserve to myself any modifications and/or variations that may appear to those skilled in the art and which fall within the scope of the following claims:

I claim:

1. An automatic seed planter for mounting on a vehicle to be moved horizontally relative to a field in which seeds are to be planted, comprising:
    an upwardly opening trough with front and rear ends;
    an elongate upwardly opening channel with laterally outwardly and upwardly divergent sides at the bottom of the trough and extending longitudinally thereof;
    a seed outlet opening adjacent the rear end of the trough communicating with the channel;
    a seed-receiving hopper positioned above the trough and in communication therewith;
    an elongate guide with radially opening and longitudinally spaced indentations, said guide being positioned in the channel in spaced relationship with the bottom thereof and stationary relative to the trough, said indentations cooperating with the sides of the channel to define seed conducting passages communicating with the trough above the guide and the channel below the guide; and
    means for vibrating the trough and causing seeds in the trough to migrate downwardly through the passages into the channel below the guide and thence longitudinally rearwardly in the channel and out through said seed outlet opening, one at a time.

2. The seed planter set forth in claim 1, wherein the passages occur in longitudinal spaced relationship at opposite sides of the guide and are limited in size to permit free movement of seeds therethrough one at a time.

3. The seed planter set forth in claim 1, wherein the guide is formed of a pair of twisted wires.

4. An automatic seed planter for mounting on a vehicle to be moved horizontally relative to a field in which seeds are to be planted, comprising:
    an upwardly opening trough with front and rear ends;
    an elongate upwardly opening channel with laterally outwardly and upwardly divergent sides at the bottom of the trough and extending longitudinally thereof;
    a seed outlet opening adjacent the rear end of the trough communicating with the channel;
    a seed-receiving chamber in the trough adjacent the front end thereof in communication with the channel;
    an elongate guide with radially opening and longitudinally spaced indentations, said guide being positioned within said chamber and in the channel in spaced relationship with the bottom thereof and stationary relative to the trough, said indentations cooperating with the sides of the channel to define seed conducting passages communicating with the seed-receiving chamber above the guide and the channel below the guide; and
    means for vibrating the trough and causing seeds in the chamber to migrate downwardly through the passages and into the channel below the guide and thence longitudinally rearwardly in the channel and out through said seed outlet opening, one at a time.

5. The seed planter set forth in claim 4, wherein the space between the guide and the bottom of the channel is limited in size to accommodate a single, longitudinally-extending row of seeds.

6. The seed planter set forth in claim 4, wherein said passages occur in longitudinal spaced relationship at opposite sides of the guide and are limited in size to permit free movement of seeds therethrough one at a time.

7. The seed planter set forth in claim 4, wherein the guide is formed of a pair of twisted wires.

8. The seed planter set forth in claim 7, wherein said wires have a circular cross-section.

9. The seed planter set forth in claim 4, which further includes a seed hopper above the trough and in communication therewith, mounting means having a first part supporting the hopper, a second part connected with a supporting vehicle, said first part being movable relative to said second part to change the angular position of the hopper relative to said supporting vehicle, and means releasably securing said first and second parts against relative movement.

10. The seed planter set forth in claim 4, which further includes:
    a box-like body which receives said trough; and
    resilient support means between the body and the trough and supporting the trough for limited movement relative to said body;
    said vibrating means being positioned between the trough and the body.

11. The seed planter set forth in claim 10, wherein the support means includes upper horizontal support flanges at the sides of the trough, lower horizontal support flanges carried by the body in spaced relationship below the upper support flanges; and shock pads of soft resilient material between related upper and lower support flanges.

12. The seed planter set forth in claim 4, which further includes:
    a box-like body which receives said trough in the bottom portion thereof;
    a seed supply carrying hopper in the upper portion of the body above the chamber and having a bottom wall with a restricted opening therein for passing seed from within the hopper into the chamber; and
    a removable cover on the hopper.

13. The seed planter set forth in claim 12, in which the bottom wall of the hopper is spaced above the chamber, and a shock pad of soft resilient material is positioned between the bottom wall of the hopper and said chamber.

14. The seed planter set forth in claim 4, in which the seed-receiving chamber in the trough includes a partition wall spaced from the front end of the trough, said wall containing a seed-passing opening at the bottom thereof establishing communication between the portions of the channel forwardly and rearwardly of the partition, and said elongate guide being fastened to said partition and extending between said partition and the front end of the trough.

15. The seed planter set forth in claim 14, in which the elongate guide extends through the seed-passing opening and rearwardly of the partition.

* * * * *